Patented Mar. 14, 1939

2,150,423

UNITED STATES PATENT OFFICE 2,150,423

FURYL AMINE DERIVATIVES

Howard I. Cramer, Cuyahoga Falls, Ohio, assignor to Wingfoot Corporation, Wilmington, Del., a corporation of Delaware No Drawing. Application November 5, 1934, Serial No. 751,591

10 Claims. (Cl. 260—345)

This invention relates to a new class of compounds which may be called carbon bisulphide derivatives of amines containing a furane ring. The compounds are simply prepared and are valuable as accelerators of the vulcanization of rubber.

The invention resides in the discovery of compounds which are illustrated by the formula $$R-C-S-M$$
$$\|$$
$$S$$

M representing metal, ammonium, substituted ammonium, dinitro aryl, aryl methylene, the group

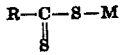

or the group

and R in all instances representing an amino group containing a furane ring. Typical of such materials are (1) The metal salts of furfuryl dithiocarbamates such as, for example, zinc ethyl alpha furfuryl dithiocarbamate having the formula:

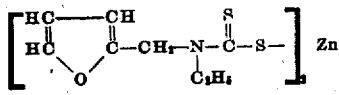

(2) The ammonium salts such as, for example, di(alpha furfuryl) ammonium di(alpha furfuryl) dithiocarbamate having the formula:

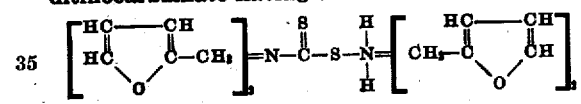

(3) The thiuram disulphides such as, for example, dibutyl di(alpha furfuryl) thiuram disulphide having the formula:

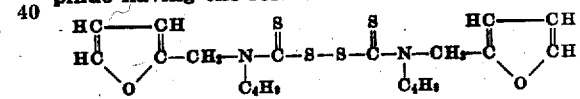

(4) The thiuram mono sulphides, such as, for example, tetra (alpha furfuryl) thiuram mono sulphide having the formula:

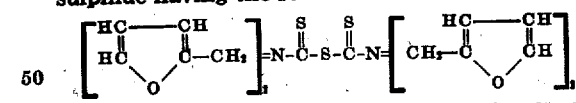

Others are dinitro phenyl di(alpha furfuryl) dithiocarbamate and phenyl methylene (benzal) bis di(alpha furfuryl) dithiocarbamate.

The methods of preparation of these new dithiocarbamic acid derivatives are similar to those employed for known dithiocarbamic acid derivatives. Thus, the substituted ammonium salts may be prepared by treating two mols of the desired amine containing a furane ring with one mol of carbon disulphide in an inert solvent, such as gasoline or petroleum ether, from which the salts readily precipitate. The metallic salts are preferably prepared by the addition of a soluble salt of a metal to an aqueous solution of the sodium dithiocarbamate, the latter being prepared by treating one mol of the amine containing a furane ring with one mol of carbon disulphide and one mol of sodium hydroxide in aqueous solution. The thiuram disulphide may be conveniently prepared by the oxidation of the sodium salt of the dithiocarbamate in aqueous solution with ammonium persulphate. The thiuram mono sulphide may be prepared from the thiuram disulphide by desulphurizing the latter by treating it in alcohol solution with one mol of potassium cyanide. The dinitrophenyl esters are prepared by adding to a molar quantity of the sodium dithiocarbamate in alcohol or water one mol of dinitro chlor benzene in warm alcohol. The phenyl methylene (benzal) derivative is prepared similarly by reacting the sodium dithiocarbamate with benzal chloride and heating the mixture to 60-70° C. for a short time.

The amines containing a furane ring applicable for use in the practice of the invention may be represented by the general formula

wherein R' is a radical containing a furane ring and R" is a monovalent radical such as hydrogen or alkyl, alicyclic, furfuryl or aralkyl groups. In general, any primary or secondary amine containing a furane ring and in which aliphatic characteristics predominate may be employed in the practice of the invention.

Illustrative of amines containing a furane ring and di alpha- and beta- furfuryl amines, di alpha- and beta- furyl amines, N-ethyl alpha- and beta- furfuryl amines, N-cyclohexyl alpha- and beta- furfuryl amines, N-benzyl alpha- and beta- furfuryl amines, di(alpha- or beta- 2-furyl ethyl) amines, N-methyl alpha furfuryl amine, N-iso butyl alpha furfuryl amine, N-beta phenyl ethylene alpha furfuryl amine, N-iso propyl alpha furfuryl amine, N-iso amyl alpha furfuryl amine, and the N-hexahydro tolyl alpha furfuryl amines.

Further exemplary of the invention are the following tables describing the properties of illustrative examples. Table I gives the melting points, if a solid compound, and the colors of the compounds. Table II gives the nitrogen, sulphur and metal, if any, contents for the compounds as compared with the theoretical percentages.

Table I

| | Compound | Melting point, °C. | Color |
|---|---|---|---|
| 1 | Di(alpha furfuryl) ammonium di(alpha furfuryl) dithiocarbamate. | Oil | Yellow. |
| 2 | Zinc di(alpha furfuryl) dithiocarbamate | 190-3 | White. |
| 3 | Lead di(alpha furfuryl) dithiocarbamate | 130-1 | Buff. |
| 4 | Tetra (alpha furfuryl) thiuram disulphide | Oil | Brown. |
| 5 | Tetra (alpha furfuryl) thiuram mono sulphide. | Oil | Do. |

Table II

| Compound | Found | | | Analyses in percent calculated | | |
|---|---|---|---|---|---|---|
| | Nitrogen | Sulphur | Metal | Nitrogen | Sulphur | Metal |
| 1 | | | | | | |
| 2 | 5.42 | 22.62 | 12.50 | 4.92 | 22.55 | 11.47 |
| 3 | 4.03 | 18.98 | 28.00 | 3.93 | 18.01 | 29.07 |
| 4 | 5.90 | 23.20 | | 5.55 | 25.44 | |
| 5 | 6.98 | 18.82 | | 5.92 | 20.34 | |

Further illustrative of these new dithiocarbamates and thiuram sulphides are potassium di(alpha furfuryl) dithiocarbamate, penta methylene ammonium alpha furfuryl dithiocarbamate, ammonium N-cyclohexyl alpha furfuryl dithiocarbamate, zinc benzyl alpha furfuryl dithiocarbamate, lead ethyl alpha furfuryl dithiocarbamate, isobutyl alpha furfuryl ammonium isobutyl alpha furfuryl dithiocarbamate, ammonium n-propyl alpha furfuryl dithiocarbamate, zinc iso amyl alpha furfuryl dithiocarbamate, and sodium beta phenyl ethylene furfuryl thiocarbamate. Others are di morpholyl di(alpha furfuryl) thiuram di- and mono- sulphides, dicyclohexyl di(alpha furfuryl) thiuram di- and mono- sulphides, diethyl di(alpha furfuryl) thiuram di- and mono- sulphides, dibenzyl di alpha furfuryl thiuram di- and mono sulphides, dimethyl di(alpha furfuryl) thiuram di- and mono- sulphides, di hexahydro tolyl di(alpha furfuryl) thiuram di- and mono- sulphides and di (beta phenyl ethylene) di(alpha furfuryl) thiuram di- and mono- sulphides.

It is intended that the patent shall cover, by suitable expression in the appended claims, whatever features of patentable novelty reside in the invention.

What I claim is:

1. A normal zinc salt of a dithiocarbamic acid in which the nitrogen atom of the dithiocarbamic acid group is attached to a radical selected from the group consisting of furo, furomethylene and furoethylene radicals.

2. An amine salt of a dithiocarbamic acid in which the nitrogen atom of the dithiocarbamic acid group is attached to a radical selected from the group consisting of furo, furomethylene and furoethylene radicals.

3. Zinc di-N-N-(alphafuromethylene) dithiocarbamate.

4. Di-N'-N'-(alphafuromethylene) ammonium di-N-N-(alphafuromethylene) dithiocarbamate.

5. A normal metal salt of an N-hydrocarbon N-alphafuromethylene dithiocarbamic acid.

6. A binary alphafuromethylene ammonium N-hydrocarbon N-alphafuromethylene dithiocarbamate.

7. A normal bivalent metal salt of di-N-N-(alphafuromethylene) dithiocarbamic acid.

8. An ammonium salt of an N-hydrocarbon N-alphafuromethylene dithiocarbamic acid.

9. A normal zinc salt of an N-hydrocarbon N-alphafuromethylene dithiocarbamic acid.

10. A dithiocarbamate selected from the group consisting of the normal metal, ammonium and amine salts of a dithiocarbamic acid in which the thiocarbamyl nitrogen is attached to a radical selected from the group consisting of furo, furomethylene, and furoethylene radicals.

HOWARD I. CRAMER.

CERTIFICATE OF CORRECTION.

Patent No. 2,150,423.                  March 14, 1939.

HOWARD I. CRAMER.

It is hereby certified that error appears in the printed specification of the above numbered patent requiring correction as follows: Page 1, second column, line 45, for the word "and" first occurrence, read are; page 2, first column, lines 42 and 43, for "thiocarbamate. Others are di morpholyl" read dithiocarbamate. Others are morpholyl; and that the said Letters Patent should be read with this correction therein that the same may conform to the record of the case in the Patent Office.

Signed and sealed this 16th day of May, A. D. 1939.

Henry Van Arsdale (Seal)                                Acting Commissioner of Patents.

following tables describing the properties of illustrative examples. Table I gives the melting points, if a solid compound, and the colors of the compounds. Table II gives the nitrogen, sulphur and metal, if any, contents for the compounds as compared with the theoretical percentages.

Table I

| | Compound | Melting point, °C. | Color |
|---|---|---|---|
| 1 | Di(alpha furfuryl) ammonium di(alpha furfuryl) dithiocarbamate. | Oil | Yellow. |
| 2 | Zinc di(alpha furfuryl) dithiocarbamate | 190-3 | White. |
| 3 | Lead di(alpha furfuryl) dithiocarbamate | 130-1 | Buff. |
| 4 | Tetra (alpha furfuryl) thiuram disulphide | Oil | Brown. |
| 5 | Tetra (alpha furfuryl) thiuram mono sulphide. | Oil | Do. |

Table II

| Compound | Found | | | Analyses in percent calculated | | |
|---|---|---|---|---|---|---|
| | Nitrogen | Sulphur | Metal | Nitrogen | Sulphur | Metal |
| 1 | | | | | | |
| 2 | 5.42 | 22.62 | 12.50 | 4.92 | 22.55 | 11.47 |
| 3 | 4.03 | 18.98 | 28.00 | 3.93 | 18.01 | 29.07 |
| 4 | 5.90 | 23.20 | | 5.55 | 25.44 | |
| 5 | 6.98 | 18.82 | | 5.92 | 20.34 | |

Further illustrative of these new dithiocarbamates and thiuram sulphides are potassium di(alpha furfuryl) dithiocarbamate, penta methylene ammonium alpha furfuryl dithiocarbamate, ammonium N-cyclohexyl alpha furfuryl dithiocarbamate, zinc benzyl alpha furfuryl dithiocarbamate, lead ethyl alpha furfuryl dithiocarbamate, isobutyl alpha furfuryl ammonium isobutyl alpha furfuryl dithiocarbamate, ammonium n-propyl alpha furfuryl dithiocarbamate, zinc iso amyl alpha furfuryl dithiocarbamate, and sodium beta phenyl ethylene furfuryl thiocarbamate. Others are di morpholyl di(alpha furfuryl) thiuram di- and mono- sulphides, dicyclohexyl di(alpha furfuryl) thiuram di- and mono- sulphides, diethyl di(alpha furfuryl) thiuram di- and mono- sulphides, dibenzyl di alpha furfuryl thiuram di- and mono sulphides, dimethyl di(alpha furfuryl) thiuram di- and mono- sulphides, di hexahydro tolyl di(alpha furfuryl) thiuram di- and mono- sulphides and di (beta phenyl ethylene) di(alpha furfuryl) thiuram di- and mono- sulphides.

It is intended that the patent shall cover, by suitable expression in the appended claims, whatever features of patentable novelty reside in the invention.

What I claim is:

1. A normal zinc salt of a dithiocarbamic acid in which the nitrogen atom of the dithiocarbamic acid group is attached to a radical selected from the group consisting of furo, furomethylene and furoethylene radicals.

2. An amine salt of a dithiocarbamic acid in which the nitrogen atom of the dithiocarbamic acid group is attached to a radical selected from the group consisting of furo, furomethylene and furoethylene radicals.

3. Zinc di-N-N-(alphafuromethylene) dithiocarbamate.

4. Di-N'-N'-(alphafuromethylene) ammonium di-N-N-(alphafuromethylene) dithiocarbamate.

5. A normal metal salt of an N-hydrocarbon N-alphafuromethylene dithiocarbamic acid.

6. A binary alphafuromethylene ammonium N-hydrocarbon N-alphafuromethylene dithiocarbamate.

7. A normal bivalent metal salt of di-N-N-(alphafuromethylene) dithiocarbamic acid.

8. An ammonium salt of an N-hydrocarbon N-alphafuromethylene dithiocarbamic acid.

9. A normal zinc salt of an N-hydrocarbon N-alphafuromethylene dithiocarbamic acid.

10. A dithiocarbamate selected from the group consisting of the normal metal, ammonium and amine salts of a dithiocarbamic acid in which the thiocarbamyl nitrogen is attached to a radical selected from the group consisting of furo, furomethylene, and furoethylene radicals.

HOWARD I. CRAMER.

CERTIFICATE OF CORRECTION.

Patent No. 2,150,423.  March 14, 1939.

HOWARD I. CRAMER.

It is hereby certified that error appears in the printed specification of the above numbered patent requiring correction as follows: Page 1, second column, line 45, for the word "and" first occurrence, read are; page 2, first column, lines 42 and 43, for "thiocarbamate. Others are di morpholyl" read dithiocarbamate. Others are morpholyl; and that the said Letters Patent should be read with this correction therein that the same may conform to the record of the case in the Patent Office.

Signed and sealed this 16th day of May, A. D. 1939.

Henry Van Arsdale (Seal)  Acting Commissioner of Patents.